(12) United States Patent
Gutierrez

(10) Patent No.: US 8,711,481 B2
(45) Date of Patent: Apr. 29, 2014

(54) POLARIZED FILM APPARATUS WITH BANDS OF ALTERNATING ORIENTATION

(75) Inventor: Roberto Gutierrez, El Paso, TX (US)

(73) Assignee: Inicia IP Holdings, LLC, Albuquerque, NM (US)

( * ) Notice: Subject to any disclaimer, the term of this patent is extended or adjusted under 35 U.S.C. 154(b) by 84 days.

(21) Appl. No.: 13/445,079

(22) Filed: Apr. 12, 2012

(65) Prior Publication Data

US 2012/0281281 A1    Nov. 8, 2012

Related U.S. Application Data

(60) Provisional application No. 61/482,086, filed on May 3, 2011.

(51) Int. Cl.
*G02B 5/30* (2006.01)
(52) U.S. Cl.
USPC .................................. 359/490.01; 359/490.03
(58) Field of Classification Search
USPC ........................................ 359/490.01, 490.03
See application file for complete search history.

(56) References Cited

U.S. PATENT DOCUMENTS

| | | | | |
|---|---|---|---|---|
| 3,863,502 A * | 2/1975 | Elliott | | 374/109 |
| 4,123,141 A * | 10/1978 | Schuler | | 359/489.07 |
| 4,491,326 A * | 1/1985 | Halsey, III | | 273/157 A |
| 5,033,829 A * | 7/1991 | Faroughy | | 359/486.03 |
| 5,159,226 A * | 10/1992 | Montgomery | | 310/333 |
| 6,301,044 B1 * | 10/2001 | Huber et al. | | 359/485.03 |
| 7,511,783 B2 * | 3/2009 | Toyooka | | 349/96 |
| 7,982,952 B2 * | 7/2011 | Hara et al. | | 359/485.01 |
| 8,077,388 B2 * | 12/2011 | Gerton et al. | | 359/486.03 |
| 8,390,927 B2 * | 3/2013 | Heiden | | 359/486.01 |
| 2006/0193046 A1 * | 8/2006 | Yellin | | 359/489 |
| 2010/0265583 A1 * | 10/2010 | Martin | | 359/501 |
| 2012/0206803 A1 * | 8/2012 | Saha | | 359/485.01 |

FOREIGN PATENT DOCUMENTS

JP    55115799 A  *  9/1980  ............. H04R 17/00

* cited by examiner

*Primary Examiner* — Frank Fort
(74) *Attorney, Agent, or Firm* — Kermit D. Lopez; Luis M. Ortiz; Ortiz & Lopez, PLLC

(57) ABSTRACT

A polarized film apparatus comprising printed bands of successively alternating polarization orientations is disclosed. The printed bands of alternating polarization orientations repeat throughout the length of the film. The polarized film can be installed in an object, for example a window where the amount of energy through the object has to be controlled. Two identical films are superimposed to create polarization patterns that can be varied when one film is displaced with respect to the other. The resulting variable polarization patterns can be utilized to control the amount of energy allowed through this arrangement. The polarized films with bands of alternating polarization orientations can be utilized to control the amount of energy for example sunlight, radiated heat transmission, illumination level, electromagnetic radiation, etc.

18 Claims, 4 Drawing Sheets

POLARIZED FILM APPARATUS WITH BANDS OF ALTERNATING ORIENTATION

CROSS-REFERENCE TO PROVISIONAL PATENT APPLICATION

This patent application claims the benefit under 35 U.S.C. §119(e) of U.S. Provisional Application Ser. No. 61/482,086 entitled, "Polarized Film Apparatus With Bands of Alternating Orientation," which was filed on May 3, 2011 and is incorporated herein by reference in its entirety.

TECHNICAL FIELD

Embodiments are generally related to polarized films. Embodiments also relate to polarized film with bands of successively alternating polarization orientations. Embodiments additionally relate to polarized films that are superimposed to create variable polarization patterns, when one film is displaced with respect to the other.

BACKGROUND OF THE INVENTION

Window tinting has been widely used to control glare, radiated heat transmission, and illumination levels in the automotive and commercial markets, and to some extent in the residential market. The most common example of this can be seen in automotive windows. Residential use appears to be more limited because homeowners expect to be able to vary the amount of light coming in through their windows more so than they do in their cars. There is also the issue of privacy and security, which may not be as big of a concern in commercial buildings. Because of this desire to have flexibility in lighting levels, and privacy when required, homeowners still predominantly use combinations of curtains, drapes, blinds, shutters, and maybe tinted or even polarized film.

The typical application of window tinting consists of tinted or polarized film that is permanently bonded to the window, for example on car side windows or large commercial windows. While this technology offers some reduction in glare and relief from heat from the Sun, the fact that the film is permanently affixed to the window does not offer any flexibility in the amount of light transmitted or any option for privacy. There are, of course, high-end alternatives that consist of micro-crystals embedded in the fabric of the glass itself and are activated by applied voltage. However, most homeowners may find the cost of such systems to be prohibitive for residential applications.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for polarized films.

It is another aspect of the disclosed embodiments to provide polarized film with bands of successively alternating polarization orientations.

It is a further aspect of the present invention to provide polarized films that are superimposed to create variable polarization patterns, when one film is displaced with respect to the other.

The aforementioned aspects and other objectives and advantages can now be achieved as described herein. A polarized film comprising printed bands of successively alternating polarization orientations is disclosed. The printed bands of altering polarization orientations repeats throughout the length of the film strip. When two identical polarized films are superimposed they create polarization patterns that can be varied when one film is displaced with respect to the other. The polarized films can be installed in an object, for example a window, where the amount of energy through the object has to be controlled.

The resulting variable polarization patterns can be utilized to control the amount of energy for example sunlight, radiated heat transmission, illumination level, electromagnetic radiation, etc. Such polarized films can be easily installed in the automotive, commercial and residential markets and the cost of the system utilizing polarized films for controlling amount of energy through it will be less. The specific number and orientation of polarization bands in a pattern and also film specifics such as the width of each band may be adjusted to fit a specific application.

A variety of different embodiments are disclosed. For example, in one embodiment, a polarized film apparatus can comprise a plurality of polarized film strips each comprising a plurality of identical bands of successively alternating polarization orientations, wherein the plurality of polarized film strips is superimposed to create a plurality of polarization patterns that can be varied when one film is displaced with respect to the other. In such an embodiment or an alternative embodiment, the plurality of polarization patterns controls an amount of energy flowing through the plurality of polarized film strips. Additionally, in the plurality of identical bands of successively alternating polarization orientations can repeat through the length of the plurality of polarized film strips. In the same or other embodiments, the plurality of identical bands in the plurality of polarization patterns can be arranged in a direction perpendicular to an intended direction of displacement. In still the same or an alternative embodiment, a folded arrangement can form the plurality of polarized film strips, wherein each film strip among the pair of polarized film strips is identical to one another. In yet another embodiment, the plurality of polarized film strips can be a pair of polarized film strips.

In other embodiments, the plurality of polarization patterns controls an amount of energy flowing through the plurality of polarized film strips, and the plurality of identical bands of successively alternating polarization orientations repeats through the length of the plurality of polarized film strips. In yet other embodiments, the plurality of identical bands in the plurality of polarization patterns can be arranged in a direction perpendicular to an intended direction of displacement; and a folded arrangement forms the plurality of polarized film strips, wherein each film strip among the pair of polarized film strips is identical to one another.

In still another embodiment, a polarized film apparatus can comprise a pair of polarized film strips each comprising a plurality of identical bands of successively alternating polarization orientations, wherein the pair of polarized film strips is superimposed to create a plurality of polarization patterns that can be varied when one film is displaced with respect to the other. In such an embodiment, the plurality of polarization patterns controls an amount of energy flowing through the pair of polarized film strips and the plurality of identical bands of successively alternating polarization orientations can repeat through the length of the pair of polarized film strips. In still other embodiments of such an apparatus, the plurality of identical bands in the plurality of polarization patterns may be arranged in a direction perpendicular to an intended direction of displacement. In still another embodiment of such an apparatus, a folded arrangement can form the pair of polarized film strips, wherein each film strip among the pair of polarized film strips are identical to one another.

In the case of the aforementioned folded arrangement, in some embodiments, the plurality of polarization patterns controls an amount of energy flowing through the pair of polarized film strips; and the plurality of identical bands of successively alternating polarization orientations repeats through the length of the pair of polarized film strips. Additionally, in some embodiments, the plurality of identical bands of successively alternating polarization orientations repeats through the length of the pair of polarized film strips; and the plurality of identical bands in the plurality of polarization patterns can be arranged in a direction perpendicular to an intended direction of displacement. In still other embodiments, the folded arrangement can be provided to form the pair of polarized film strips, wherein each film strip among the pair of polarized film strips are identical to one another.

In yet another embodiment, the polarized film apparatus can comprise a pair of polarized film strips each comprising a plurality of identical bands of successively alternating polarization orientations, wherein the pair of polarized film strips is superimposed to create a plurality of polarization patterns that can be varied when one film is displaced with respect to the other, wherein the plurality of polarization patterns controls an amount of energy flowing through the pair of polarized film strips. In such an embodiment, the aforementioned folded arrangement can form the pair of polarized film strips, wherein each film strip among the pair of polarized film strips are identical to one another.

In such an embodiment, the plurality of identical bands of successively alternating polarization orientations may repeat through the length of the pair of polarized film strips. In alternative embodiment, the plurality of identical bands in the plurality of polarization patterns can be arranged in a direction perpendicular to an intended direction of displacement.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
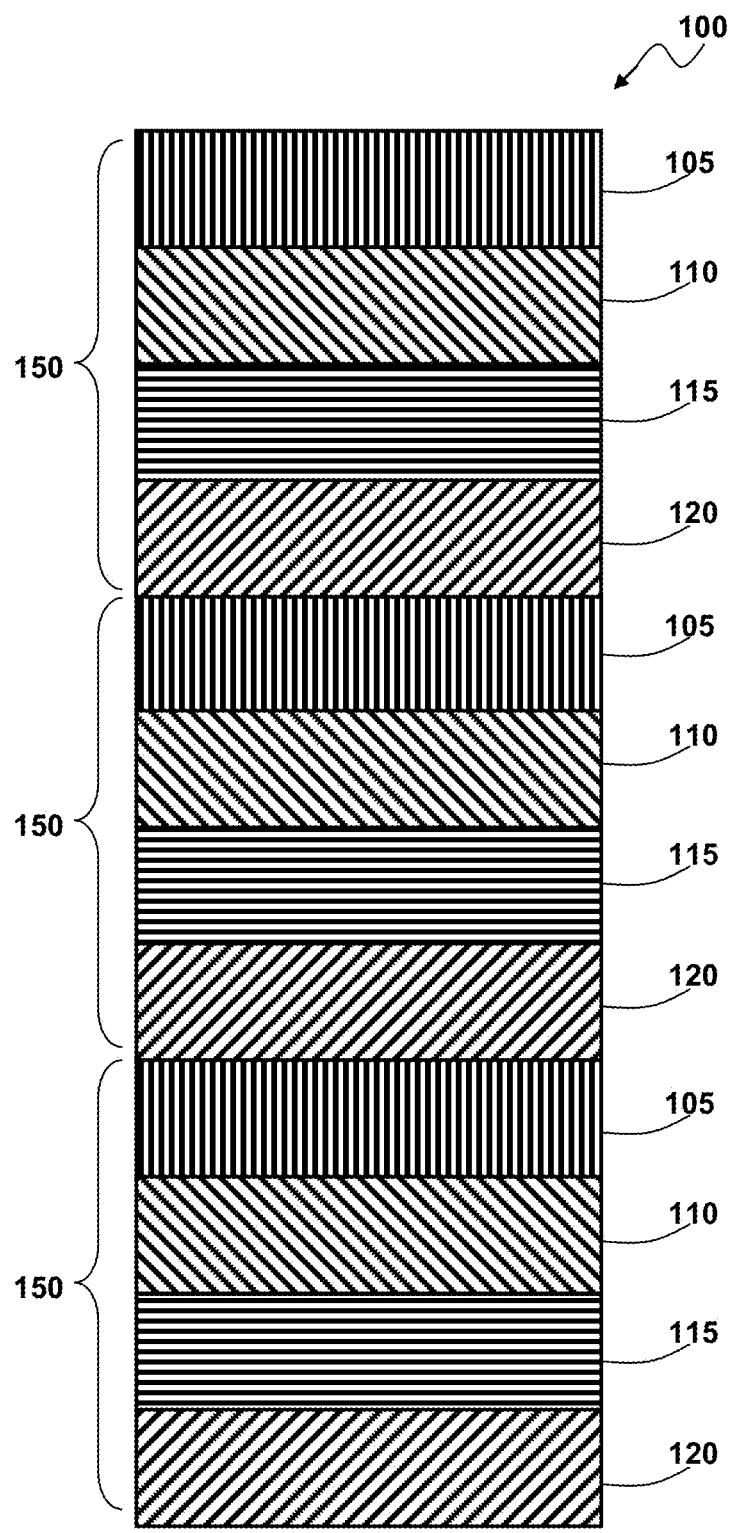
FIG. 1 illustrates an exploded view of a polarized film strip comprising printed bands of successively alternating polarization orientations, in accordance with the disclosed embodiments.

FIG. 1 illustrates an exploded view of a polarized film strip 100 comprising printed bands of successively alternating polarization orientations 105, 110, 115 and 120, in accordance with the disclosed embodiments. The film strip 100 has a pattern 150 of four distinct polarization orientations 105, 110, 115 and 120 and this pattern 150 repeats through the length of the film strip 100. The polarization orientations 105, 110, 115 and 120 of film strip 100 are vertical, negative 45°, horizontal and positive 45° respectively. Polarization orientations other than 105, 110, 115 and 120 can also be used without limitation.

Figure 2C:
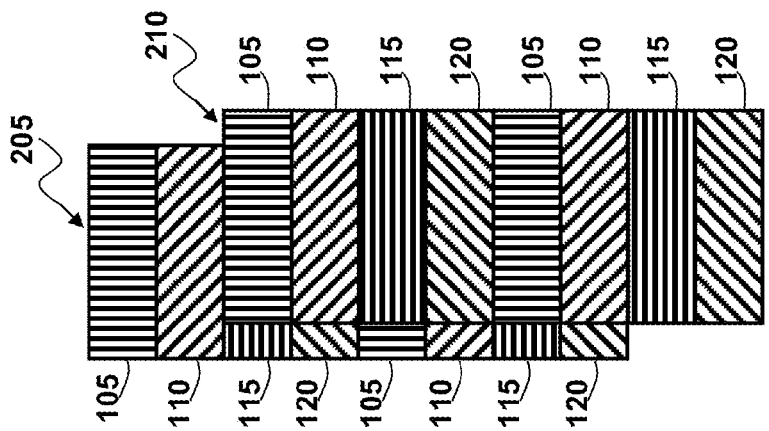
FIG. 2C illustrates an exploded view of two identical films strips superimposed to create polarization patterns in 'closed' state, in accordance with the disclosed embodiments.
Figure 2B:
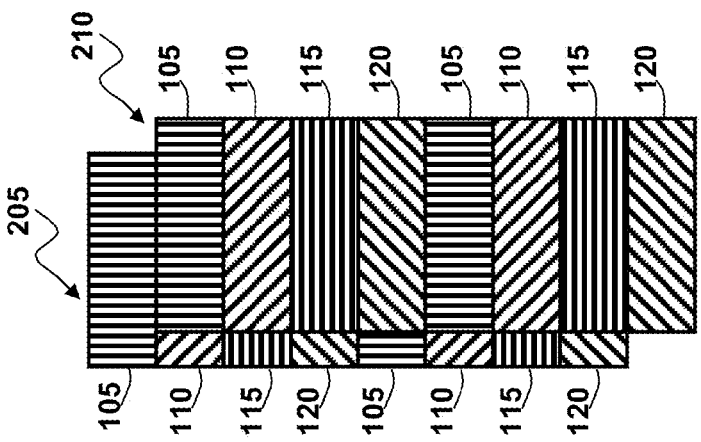
FIG. 2B illustrates an exploded view of two identical films strips superimposed to create polarization patterns in 'partially open' state, in accordance with the disclosed embodiments.
Figure 2A:
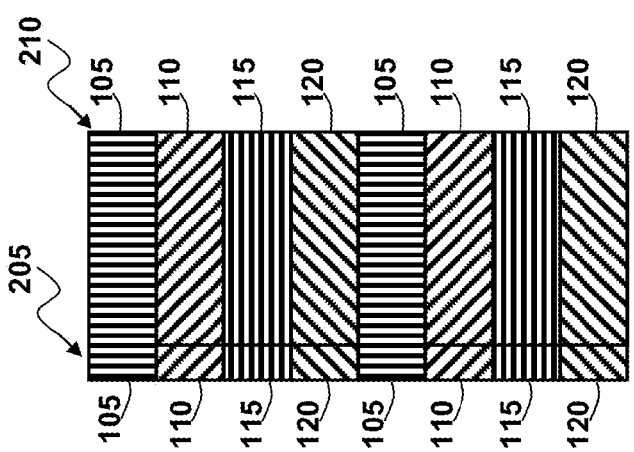
FIG. 2A illustrates an exploded view of two identical films strips superimposed to create polarization patterns in 'fully open' state, in accordance with the disclosed embodiments.

FIG. 2A-2C illustrates exploded views of two identical films strips 205 and 210 superimposed to create different polarization patterns, in accordance with the disclosed embodiments. When two identical films 205 and 210 are superimposed, they create polarization patterns that can be varied when film 210 is displaced with respect to the other film 205 The resulting variable polarization patterns controls the amount of light passing through the films 205 and 210.

FIG. 2A shows two identical films 205 and 210 aligned together to form 'Fully Open' state. 'Fully Open' state allows maximum amount of light to pass through the films 205 and 210. FIG. 2B shows two identical films 205 and 210 misaligned by moving film 210 with respect to other film 205 to form 'Partially Open' state. 'Partially Open' state allows partial amount of light to pass through the films 205 and 210. In FIG. 2C the two identical films 205 and 210 are misaligned by moving film 210 with respect to other film 205 to form 'Closed' state. 'Closed' state allows minimum amount of light to pass through the films 205 and 210.

The linear displacement of two superimposed films may be achieved in any number of ways, from two simple rigidly framed panels of film held one over the other, to a more complex and well-packaged design meant to be, for example, permanently installed at a window.

Figures 3A, 3B:
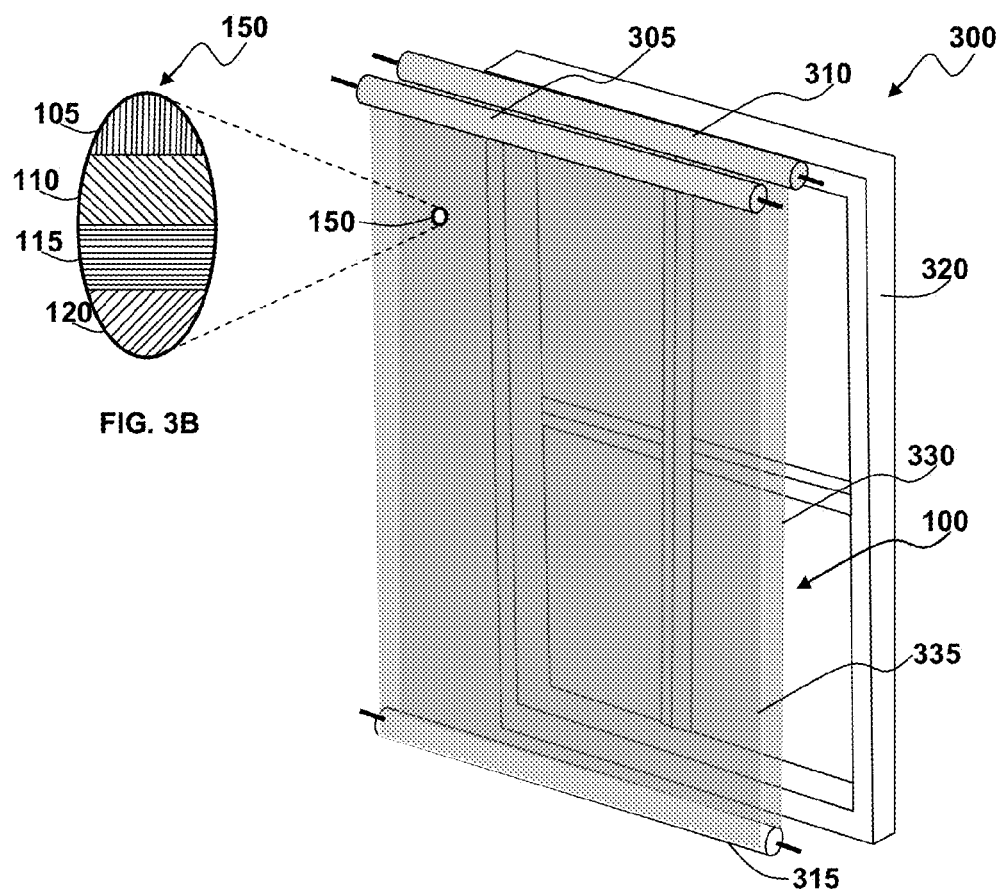
FIG. 3A illustrates a perspective view of a polarized film with bands of alternating orientation installed in a window, in accordance with the disclosed embodiments.
FIG. 3B illustrates an exploded view of a pattern depicted in FIG. 3A, in accordance with the disclosed embodiments.

FIG. 3A illustrates a perspective view of an arrangement 300 comprising a continuous polarized film 100 depicted in FIG. 1 with bands of alternating orientation installed in a window 320, in accordance with the disclosed embodiments. The pattern 150 depicted in FIG. 3A is too small and is nearly invisible to the human eye. FIG. 3B shows an exploded view of the pattern 150 depicted in FIG. 3A. A continuous strip of film 100 with alternating polarization patterns 150 is arranged so that each end is rolled a predetermined amount of turns over one of two upper rollers 305 and 310. The width of the film 100 is sized to correspond to the width of the window 320. A lower roller 315 is positioned so as to cause the continuous strip of film 100 to fold approximately in half, at a distance from the upper rollers 305 and 310 corresponding approximately to the height of the window 320. The upper rollers 305 and 310 are positioned at the top of the window 320 such that their relative position to each other and to the window 320 is fixed, but they may rotate about their respective axis. The lower roller 315 is weighted or otherwise fixed at the bottom of the window 320, again free to rotate about its axis.

The arrangement 300 in FIG. 3A causes the continuous strip of film 100 to be effectively divided into two superimposed strips 330 and 335. The strips 330 and 335 are also called as front panel 330 and rear panel 335 respectively. The upper rollers 305 and 310 are simultaneously turned so that one end of the strip is being rolled in while the other is being rolled out causing the alignment of patterns to change while keeping the length of both front and rear panels 330 and 335 constant.

Figure 4:
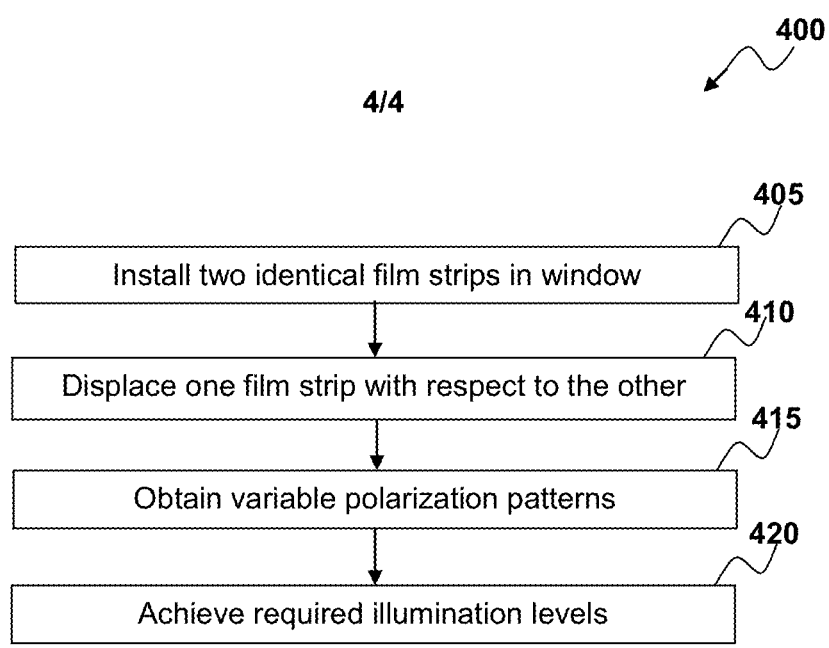
FIG. 4 illustrates a flow chart depicting the process of adjusting the amount of light entering a window, in accordance with the disclosed embodiments.

FIG. 4 illustrates a flow chart 400 depicting the process of adjusting the amount of light entering a window, in accordance with the disclosed embodiments. As indicated at block 405, the two identical film strips with bands of alternating polarization are installed in a window. The identical films are superimposed to create variable polarization patterns. A continuous strip can also be utilized for this purpose by folding it into half in a folding arrangement to obtain two identical films strips as depicted in FIG. 3. Following implementation of the operation indicated at block 405, one film strip can be displaced with respect to the other, as shown at block 410. According to single continuous film or two film strips arrangement, one or both the strips are moved to obtain variable polarization patterns as depicted at block 415. As illustrated at block 420, the strips can be moved until required amount of light passing through the window is achieved.

The pattern 150 illustrated in FIG. 1 and FIG. 2A-2C will allow three different levels of light transmission, from "fully open" to "partially open" to "closed". However, it should be understood that this disclosure is not limited to one specific pattern, and that different patterns may achieve different degrees of interference of light transmission. It should also be understood that, FIG. 1-4 deals with sunlight; the concept may be used in any other application where electromagnetic radiation is to be attenuated.

The films of rectangular strips are more suitable for residential or commercial building applications, where windows are typically rectangular, or any other application where vertical or horizontal displacement is preferred to rotational. It should be understood that the bands in the polarization pattern should be arranged in a direction perpendicular to the intended direction of displacement. The scale of the pattern in FIG. 1 and FIG. 2A-2C have been exaggerated for clarity, and it should be understood that this pattern may be virtually undetectable to the human eye. It should also be understood that the specific number and orientation of polarization bands in the pattern, as well as specifics such as the width of each band, may be adjusted to fit a specific application.

Based on the foregoing, it can be appreciated that a variety of different embodiments are disclosed. For example, in one embodiment, a polarized film apparatus can comprise a plurality of polarized film strips each comprising a plurality of identical bands of successively alternating polarization orientations, wherein the plurality of polarized film strips is superimposed to create a plurality of polarization patterns that can be varied when one film is displaced with respect to the other. In such an embodiment or an alternative embodiment, the plurality of polarization patterns controls an amount of energy flowing through the plurality of polarized film strips. Additionally, in the plurality of identical bands of successively alternating polarization orientations can repeat through the length of the plurality of polarized film strips. In the same or other embodiments, the plurality of identical bands in the plurality of polarization patterns can be arranged in a direction perpendicular to an intended direction of displacement. In still the same or an alternative embodiment, a folded arrangement can form the plurality of polarized film strips, wherein each film strip among the pair of polarized film strips is identical to one another. In yet another embodiment, the plurality of polarized film strips can be a pair of polarized film strips.

In other embodiments, the plurality of polarization patterns controls an amount of energy flowing through the plurality of polarized film strips, and the plurality of identical bands of successively alternating polarization orientations repeats through the length of the plurality of polarized film strips. In yet other embodiments, the plurality of identical bands in the plurality of polarization patterns can be arranged in a direction perpendicular to an intended direction of displacement; and a folded arrangement forms the plurality of polarized film strips, wherein each film strip among the pair of polarized film strips is identical to one another.

In still another embodiment, a polarized film apparatus can comprise a pair of polarized film strips each comprising a plurality of identical bands of successively alternating polarization orientations, wherein the pair of polarized film strips is superimposed to create a plurality of polarization patterns that can be varied when one film is displaced with respect to the other. In such an embodiment, the plurality of polarization patterns controls an amount of energy flowing through the pair of polarized film strips and the plurality of identical bands of successively alternating polarization orientations can repeat through the length of the pair of polarized film strips. In still other embodiments of such an apparatus, the plurality of identical bands in the plurality of polarization patterns may be arranged in a direction perpendicular to an intended direction of displacement. In still another embodiment of such an apparatus, a folded arrangement can form the pair of polarized film strips, wherein each film strip among the pair of polarized film strips are identical to one another.

In the case of the aforementioned folded arrangement, in some embodiments, the plurality of polarization patterns controls an amount of energy flowing through the pair of polarized film strips; and the plurality of identical bands of successively alternating polarization orientations repeats through the length of the pair of polarized film strips. Additionally, in some embodiments, the plurality of identical bands of successively alternating polarization orientations repeats through the length of the pair of polarized film strips; and the plurality of identical bands in the plurality of polarization patterns can be arranged in a direction perpendicular to an intended direction of displacement. In still other embodiments, the folded arrangement can be provided to form the pair of polarized film strips, wherein each film strip among the pair of polarized film strips are identical to one another.

In yet another embodiment, the polarized film apparatus can comprise a pair of polarized film strips each comprising a plurality of identical bands of successively alternating polarization orientations, wherein the pair of polarized film strips is superimposed to create a plurality of polarization patterns that can be varied when one film is displaced with respect to the other, wherein the plurality of polarization patterns controls an amount of energy flowing through the pair of polarized film strips. In such an embodiment, the aforementioned folded arrangement can form the pair of polarized film strips, wherein each film strip among the pair of polarized film strips are identical to one another.

In such an embodiment, the plurality of identical bands of successively alternating polarization orientations may repeat through the length of the pair of polarized film strips. In alternative embodiment, the plurality of identical bands in the plurality of polarization patterns can be arranged in a direction perpendicular to an intended direction of displacement.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A polarized film apparatus, comprising:
a plurality of polarized film strips each comprising a plurality of identical bands of successively alternating polarization orientations, wherein said plurality of polarized film strips is superimposed to create a plurality of polarization patterns that can be varied when one film is displaced with respect to the other; and
a folded arrangement to form said plurality of polarized film strips, wherein each film strip among said plurality of polarized film strips is identical to one another.

2. The apparatus of claim 1 wherein said plurality of polarization patterns controls an amount of energy flowing through said plurality of polarized film strips.

3. The apparatus of claim 1 wherein said plurality of identical bands of successively alternating polarization orientations repeats through the length of said plurality of polarized film strips.

4. The apparatus of claim 1 wherein said plurality of identical bands in said plurality of polarization patterns are arranged in a direction perpendicular to an intended direction of displacement.

5. The apparatus of claim 1 where said plurality of polarized film strips comprises a pair of polarized film strips.

6. The apparatus of claim 1 wherein:
said plurality of polarization patterns controls an amount of energy flowing through said plurality of polarized film strips; and
said plurality of identical bands of successively alternating polarization orientations repeats through the length of said plurality of polarized film strips.

7. The apparatus of claim 1 wherein:
said plurality of identical bands in said plurality of polarization patterns are arranged in a direction perpendicular to an intended direction of displacement; and
wherein a folded arrangement forms said plurality of polarized film strips, wherein each film strip among said pair of polarized film strips is identical to one another.

8. A polarized film apparatus, comprising:
a pair of polarized film strips each comprising a plurality of identical bands of successively alternating polarization orientations, wherein said pair of polarized film strips is superimposed to create a plurality of polarization patterns that can be varied when one film is displaced with respect to the other; and
a folded arrangement to form said air of polarized film strips wherein each film strip among said pair of polarized film strips is identical to one another.

9. The apparatus of claim 8 wherein said plurality of polarization patterns controls an amount of energy flowing through said pair of polarized film strips.

10. The apparatus of claim 8 wherein said plurality of identical bands of successively alternating polarization orientations repeats through the length of said pair of polarized film strips.

11. The apparatus of claim 8 wherein said plurality of identical bands in said plurality of polarization patterns are arranged in a direction perpendicular to an intended direction of displacement.

12. The apparatus of claim 8 wherein:
said plurality of polarization patterns controls an amount of energy flowing through said pair of polarized film strips; and
said plurality of identical bands of successively alternating polarization orientations repeats through the length of said pair of polarized film strips.

13. The apparatus of claim 8 wherein:
said plurality of identical bands of successively alternating polarization orientations repeats through the length of said pair of polarized film strips; and
wherein said plurality of identical bands in said plurality of polarization patterns are arranged in a direction perpendicular to an intended direction of displacement.

14. The apparatus of claim 12 further comprising a folded arrangement to form said pair of polarized film strips, wherein each film strip among said pair of polarized film strips is identical to one another.

15. The apparatus of claim 13 further comprising a folded arrangement to form said pair of polarized film strips, wherein each film strip among said pair of polarized film strips is identical to one another.

16. A polarized film apparatus, comprising:
a pair of polarized film strips each comprising a plurality of identical bands of successively alternating polarization orientations, wherein said pair of polarized film strips is superimposed to create a plurality of polarization patterns that can be varied when one film is displaced with respect to the other, wherein said plurality of polarization patterns controls an amount of energy flowing through said pair of polarized film strips; and a folded arrangement to form said pair of polarized film strips, wherein each film strip among said pair of polarized film strips is identical to one another.

17. The apparatus of claim 16 wherein said plurality of identical bands of successively alternating polarization orientations repeats through the length of said pair of polarized film strips.

18. The apparatus of claim 16 wherein said plurality of identical bands in said plurality of polarization patterns are arranged in a direction perpendicular to an intended direction of displacement.

* * * * *